United States Patent
Siebert et al.

(10) Patent No.: US 10,099,457 B2
(45) Date of Patent: Oct. 16, 2018

(54) ADHESIVE TAPE FOR JACKETING ELONGATE MATERIAL SUCH AS ESPECIALLY CABLE LOOMS AND JACKETING METHOD

(75) Inventors: Michael Siebert, Schenefeld (DE); Dennis Seitzer, Hamburg (DE)

(73) Assignee: TESA SE, Hamburg (DE)

( * ) Notice: Subject to any disclaimer, the term of this patent is extended or adjusted under 35 U.S.C. 154(b) by 542 days.

(21) Appl. No.: 13/421,937

(22) Filed: Mar. 16, 2012

(65) Prior Publication Data
US 2012/0238172 A1 Sep. 20, 2012

(30) Foreign Application Priority Data
Mar. 18, 2011 (DE) .................. 10 2011 005 763

(51) Int. Cl.
*D04H 1/00* (2006.01)
*B32B 5/02* (2006.01)
(Continued)

(52) U.S. Cl.
CPC .............. *B32B 27/32* (2013.01); *B32B 5/022* (2013.01); *B32B 5/08* (2013.01); *B32B 7/12* (2013.01); *B32B 27/08* (2013.01); *B32B 27/12* (2013.01); *C09J 7/29* (2018.01); *B32B 2250/04* (2013.01); *B32B 2255/10* (2013.01); *B32B 2255/26* (2013.01); *B32B 2262/0276* (2013.01); *B32B 2262/062* (2013.01); *B32B 2262/14* (2013.01); *B32B 2305/20* (2013.01); *B32B 2307/102* (2013.01); *B32B 2307/308* (2013.01);
(Continued)

(58) Field of Classification Search
None
See application file for complete search history.

(56) References Cited

U.S. PATENT DOCUMENTS 4,699,824 A * 10/1987 Pufahl .................. H02M 3/337
428/220
4,898,761 A * 2/1990 Dunaway ................ B32B 27/02
156/244.18
(Continued)

FOREIGN PATENT DOCUMENTS

CN 1729264 A 2/2006
CN 101338168 A 1/2009
(Continued)

OTHER PUBLICATIONS

Machine translation of DE202004019761, Coroplast, May 2006.*
(Continued)

*Primary Examiner* — Shawn Mckinnon
(74) *Attorney, Agent, or Firm* — Norris McLaughlin & Marcus, P.A.

(57) ABSTRACT

An adhesive tape, especially for jacketing elongate material such as cable looms in a motor vehicle, having a carrier material which is provided at least on one side with an adhesive coating, characterized in that the carrier material consists of a laminate, the laminate being formed from a textile carrier in the form of a staple fiber web or a spunbonded web and from a film which is located on the underside of the textile carrier and is made preferably of polyolefins, TPU or PVC such as plasticized PVC, more preferably of polyolefins, the film having a thickness of 15 to 80 μm.

16 Claims, 2 Drawing Sheets

(51) Int. Cl.
  *B32B 27/12* (2006.01)
  *B32B 37/12* (2006.01)
  *B32B 27/32* (2006.01)
  *B32B 5/08* (2006.01)
  *B32B 7/12* (2006.01)
  *B32B 27/08* (2006.01)
  *C09J 7/29* (2018.01)

(52) U.S. Cl.
  CPC ... *B32B 2307/554* (2013.01); *B32B 2307/582* (2013.01); *B32B 2307/714* (2013.01); *B32B 2307/718* (2013.01); *B32B 2405/00* (2013.01); *B32B 2457/00* (2013.01); *C09J 2203/302* (2013.01); *C09J 2400/263* (2013.01); *C09J 2433/00* (2013.01); *C09J 2483/00* (2013.01); *Y10T 428/2915* (2015.01); *Y10T 442/608* (2015.04); *Y10T 442/678* (2015.04); *Y10T 442/681* (2015.04)

(56) References Cited

U.S. PATENT DOCUMENTS

| | | | |
|---|---|---|---|
| 5,100,976 | A | 3/1992 | Hamada et al. |
| 5,208,300 | A | 5/1993 | Krahnke et al. |
| 5,281,455 | A | 1/1994 | Braun et al. |
| 5,910,225 | A * | 6/1999 | McAmish .......... B32B 27/12 156/229 |
| 6,432,529 | B1 | 8/2002 | Harder et al. |
| 6,541,707 | B2 | 4/2003 | Kulper et al. |
| 6,613,870 | B1 | 9/2003 | Harder et al. |
| 2002/0125037 | A1 | 9/2002 | Kulper |
| 2002/0132547 | A1* | 9/2002 | Grondin .......... B32B 27/12 442/401 |
| 2004/0082243 | A1 | 4/2004 | Kuelper |
| 2004/0253889 | A1 | 12/2004 | Mundt |
| 2005/0154166 | A1 | 7/2005 | Husemann et al. |
| 2006/0182950 | A1 | 8/2006 | Yun et al. |
| 2007/0275623 | A1* | 11/2007 | Mussig .......... 442/398 |
| 2008/0281037 | A1* | 11/2008 | Karjala et al. .......... 524/571 |
| 2009/0008026 | A1 | 1/2009 | Kopf et al. |
| 2009/0139637 | A1* | 6/2009 | Kopf .......... B32B 7/12 156/187 |
| 2009/0291303 | A1 | 11/2009 | Kopf et al. |
| 2011/0056616 | A1 | 3/2011 | Kopf et al. |
| 2013/0269861 | A1 | 10/2013 | Kopf et al. |

FOREIGN PATENT DOCUMENTS

| | | | |
|---|---|---|---|
| CN | 101452752 A | | 6/2009 |
| CN | 101586008 A | | 11/2009 |
| DE | 4032511 | * | 4/1992 |
| DE | 94 01 037 U1 | | 3/1994 |
| DE | 43 19 023 C1 | | 9/1994 |
| DE | 43 13 008 C2 | | 11/1994 |
| DE | 44 42 093 C1 | | 5/1996 |
| DE | 198 07 752 A1 | | 8/1999 |
| DE | 100 11 788 A1 | | 3/2002 |
| DE | 100 39 982 A1 | | 3/2002 |
| DE | 101 49 975 A1 | | 11/2002 |
| DE | 103 41 123 A1 | | 3/2005 |
| DE | 20 2004 019761 U1 | | 5/2006 |
| EP | 0 370 689 A2 | | 5/1990 |
| EP | 0 668 336 A1 | | 8/1995 |
| EP | 1 035 185 A2 | | 9/2000 |
| EP | 1 448 744 A1 | | 8/2004 |
| EP | 1 511 140 A2 | | 3/2005 |
| WO | WO9306183 | * | 4/1993 |
| WO | 00 13894 A1 | | 3/2000 |
| WO | WO0013894 | * | 3/2000 |
| WO | WO 2009110887 | * | 9/2009 |

OTHER PUBLICATIONS

Machine translation of DE4032511, Kaiser, 1992 (Year: 1992).*
Machine translation of WO0013894, Kraft, 2000 (Year: 2000).*
European Search Report for corresponding EP application No. 12157819.9 dated Jul. 5, 2012.
English translation of the first Chinese Office Action in corresponding Application CN 201210073075.3 dated Oct. 2014.

* cited by examiner

ADHESIVE TAPE FOR JACKETING ELONGATE MATERIAL SUCH AS ESPECIALLY CABLE LOOMS AND JACKETING METHOD

The invention relates to an adhesive tape intended preferably for wrapping elongate material such as more particularly leads or cable looms. The invention further relates to the use of the adhesive tape and also to an elongate material such as a cable harness jacketed with the adhesive tape of the invention.

In numerous sectors of industry, bundles composed of a multiplicity of electrical leads are wrapped either before installation or when already mounted, in order to reduce the space taken up by the bundle of leads, by means of bandaging, and also, in addition, to obtain protective functions. With film-backed adhesive tapes, a certain protection against ingress of fluid is achieved as well; with adhesive tapes based on thick nonwovens or foams as carriers, damping properties are obtained; and, when stable, abrasion-resistant carrier materials are used, a protective function against scuffing and rubbing is achieved.

The use of adhesive tapes with a nonwoven web as carrier for the bandaging of cable harnesses is known. DE 94 01 037 U1 or EP 0 668 336 A1, for instance, describe an adhesive tape having a tapelike textile carrier composed of a stitch-bonded or thread-stitched nonwoven web, which is formed in turn from a multiplicity of stitched-in threads running parallel to one another. In its use for cable harness bandaging, the specific construction of the adhesive tape described allows it to exhibit sound damping properties. As well as the thread-stitched nonwoven web referred to in the cited specifications, there are other carriers which are employed in adhesive tapes for cable harness bandaging.

DE 44 42 093 C1 is based on the use, as carrier for an adhesive tape, of a nonwoven web which is produced by the formation of loops from the fibres of the web, in the form of a reinforced cross-laid fibre web, in other words a web known to the skilled person under the name of Malivlies.

The above-described disadvantages of the Maliwatt web also affect Malivlies. Deficient fibre incorporation results in a high level of fibre extraction or must be compensated by means of further measures if the web is used for adhesive tapes. Another factor is that, owing to the absence of stitching thread, the longitudinal strength is not high, and, in particular, the adhesive tape exhibits a high level of stretch, resulting in narrowing and distortion on unwind and in application of the adhesive tape.

DE 100 39 982 A1 describes an adhesive tape which is based on a nonwoven web carrier and which, with low basis weights of 20 to 80 g/m$^2$, produces damping values of 3 to 10 dB(A). The preferred web carrier in this case is a staple fibre web without further stitching threads, a spunbonded web (filament web) without stitching threads or a meltblown web without stitching threads.

The testing and classifying of adhesive tapes for cable jacketing takes place in the motor industry in accordance with extensive bodies of standards such as, for example, LV 312-1 "Protection systems for wire harnesses in motor vehicles, adhesive tapes; test guideline" (October 2009), as a joint standard of the companies Daimler, Audi, BMW and Volkswagen, or the Ford specification ES-AC3T-1A303-AA (revised version September 2009) "Harness Tape Performance Specification". In the text below, these standards are referred to in abbreviated form as LV 312 and Ford specification, respectively.

The sound-damping effect, the abrasion resistance and the temperature stability of an adhesive tape are determined on the basis of defined test systems and test methods, as are described comprehensively in LV 312.

The adhesive tapes are then classified as shown below in table 1:

TABLE 1

| Sound damping classification to LV 312 | |
|---|---|
| Sound damping class | Requirement |
| A no sound damping | 0 to ≤2 dB(A) |
| B low sound damping | >2 to ≤5 dB(A) |
| C moderate sound damping | >5 to ≤10 dB(A) |
| D high sound damping | >10 to ≤15 dB(A) |
| E very high sound damping | >15 dB(A) |

The abrasion resistance of an adhesive tape is determined in accordance with LV 312 likewise on the basis of a defined test method. The classification of the adhesive tapes in terms of their abrasion resistance, for a mandrel diameter of 5 mm, is shown in table 2:

TABLE 2

| Abrasion resistance classification to LV 312 | |
|---|---|
| Abrasion class | Requirement |
| A no abrasion protection | <100 strokes |
| B low abrasion protection | 100-499 strokes |
| C moderate abrasion protection | 500-999 strokes |
| D high abrasion protection | 1000-4999 strokes |
| E very high abrasion protection | 5000-14999 strokes |
| F extremely high abrasion protection | ≥15000 strokes |

The test specimen, with a length of approximately 10 cm, is adhered in a single ply in longitudinal direction to a steel mandrel having a thickness of 5 mm. The abrading tool used is a steel wire with a diameter of 0.45 mm, which passes abrasively over the middle of the test specimen under a weight load of 7 N. For further details, refer to LV 312. In contrast to LV 312, the measurements are made only at room temperature.

The custom-tailored development of cable wrapping tapes for specific requirements such as, for example, high noiseproofing, high abrasion resistance or chemical resistance is known.

What is still lacking, however, is an adhesive tape which combines a plurality of properties with one another and hence exhibits a significantly extended service spectrum.

Important properties to be met for the characterization and classification of adhesive tapes which can be used in particular for cable bandaging are as follows:
a) Sound damping (under LV 312):
  preferably class B or higher
  To date, the sound damping classes set out above have been met as follows.
  class A: films
  class B: thick, flexible films; thin, smooth nonwoven webs (for example spunbonded or wet-laid webs) with a basis weight, for example, of 80 g/m$^2$.
  class C: soft, bulky nonwoven webs (for example a Maliwatt web having a carrier weight of 60 to 120 g/m$^2$)
  class D: thick, bulky nonwoven webs, for example needle-punched webs or a Maliwatt having a carrier weight of 120 g/m$^2$ or higher b) Temperature resistance (under Ford):
    preferably T2 or higher
To date the temperature classes have been met as follows, with selection here of T1 to T5 rather than the class designations A to F as mentioned in the Ford specification.
    T2 (100° C.): non-crosslinked PE films; PP films; PP nonwoven webs, viscose
    T3 (125° C.): crosslinked PE films; nonwoven webs made of polyester in general, as for example PBT, PA
    T4 (150° C.): nonwoven webs of PET
2) Compatibility with core insulations (under LV 312):
    preferably T2 or higher
Compatibility with the core insulations is dependent essentially on the adhesives. Provided it does not form harmful degradation products, the carrier may make a positive contribution by sealing the system off from the atmosphere. The temperature classes correspond to those in section b), with selection here of T1 to T5 rather than the class designations A to F referred to in LV 312.
a) Hand tearability as per the method of AFERA 4007:
    Easy tearability and clean torn edge in transverse direction (where Maliwatt is the model, corresponding to a smooth tear which extends exactly in the transverse direction, without jags)
b) Protection of the cable against media, in analogy to LV 312

The object on which the present invention is based is that of providing an adhesive tape which at the same time combines all of the abovementioned properties and which allows the simple, inexpensive and rapid jacketing of elongate material such as cable looms in motor vehicles.

This object is achieved by means of an adhesive tape as specified in the main claim. The dependent claims provide advantageous developments of the adhesive tape and methods of employing the adhesive tape.

The invention accordingly provides an adhesive tape, especially for jacketing elongate material such as cable looms in a motor vehicle, having a carrier material which is provided at least on one side with an adhesive coating, where the carrier material consists of a laminate, the laminate being formed from a textile carrier in the form of a staple fibre nonwoven web or a spunbonded nonwoven web and from a film which is located on the underside of the textile carrier and is made preferably of polyolefins, TPU or PVC such as plasticized PVC, more preferably of polyolefins, the film having a thickness of 15 to 80 μm.

Nonwovens contemplated include, in particular, staple fibre webs, preferably wet-laid webs, needle-punched webs or water-jet webs, and also spunbonded webs, which in one preferred embodiment are additionally consolidated.

Possible methods of consolidation known for nonwoven webs are mechanical, thermal and chemical consolidation. Whereas with mechanical consolidations the fibres are held together purely mechanically, usually by entanglement of the individual fibres, by the interlooping of fibre bundles or by the stitching-in of additional threads, it is possible by thermal and by chemical techniques to obtain adhesive (with binder) or cohesive (binderless) fibre-fibre bonds. Given appropriate formulation and an appropriate process regime, these bonds may be restricted exclusively, or at least predominantly, to fibre nodal points, so that a stable, three-dimensional network is formed while retaining the loose, open structure in the web.

Webs which have proved to be advantageous are those consolidated in particular by overstitching with separate threads or by interlooping.

Also particularly suitable are needle-punched webs. In a needle-punched web, a sheetlike structure is formed from a fibre tuft using needles that are provided with barbs. By alternate introduction and withdrawal of the needles, the material is consolidated on a needle bar, with the individual fibres interlooping to form a firm sheetlike structure. The number and embodiment of the needling points (needle shape, penetration depth, needling on both sides) determine the thickness and strength of the fibre structures, which in general are lightweight, air-permeable and elastic.

Also particularly advantageous is a staple fibre web which is mechanically preconsolidated in a first step or is a wet-laid web laid hydrodynamically, with between 2% and 50% by weight of the web fibres being fusible fibres, more particularly between 5% and 40% by weight of the web fibres.

A web of this kind is characterized in that the fibres are laid wet or, for example, a staple fibre web is preconsolidated by the formation of loops from fibres of the web, by means of needling, stitching, air-jet and/or water-jet treatment.

In a second step, thermofixing takes place, with the strength of the web being increased again by the melting, or partial melting, of the fusible fibres.

For the utilization of nonwoven webs in accordance with the invention, the adhesive consolidation of mechanically preconsolidated or wet-laid webs is of particular interest, and may take place via addition of binder in solid, liquid, foamed or pastelike form. A great diversity of theoretical embodiments is possible: for example, solid binders as powders for trickling in, as a sheet or as a mesh, or in the form of binding fibres. Liquid binders may be applied as solutions in water or organic solvents, or as a dispersion. For adhesive consolidation, binding dispersions are selected predominantly: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC, and the like, and also copolymers thereof. Normally, the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for producing specific changes in the surface properties.

Such a procedure not only is sparing in its use of binder but also greatly reduces the energy requirement for drying. Since no squeeze rolls are required and the dispersions remain predominantly in the upper region of the web material, unwanted hardening and stiffening of the web can be largely avoided.

For sufficient adhesive consolidation of the web carrier, the addition of binder in the order of magnitude of 1% to 50%, more particularly 3% to 20%, based on the weight of the fibre web, is generally required.

The binder may be added as early as during the manufacture of the web, in the course of mechanical preconsolidation, or else in a separate process step, which may be carried out in-line or off-line. Following the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of areal or partial application of pressure. The binder may be activated in known drying tunnels, or else, given an appropriate selection of binder, by means of infra-red radiation, UV radiation, ultrasound, high-frequency radiation or the like. For the subsequent end use it is sensible, though not absolutely necessary, for the binder to have lost its tack following the end of the web production process. It is advantageous that, as a result of the thermal treatment, volatile components such as fibre assistants are removed, giving a web having favourable fogging values, so that when a low-fogging adhesive is used, it is possible to produce an adhesive tape having particularly favourable fogging values; accordingly, the carrier as well has a very low fogging value.

By fogging (see DIN 75201 A) is meant the effect where, under unfavourable conditions, compounds of low molecular mass may outgas from the adhesive tapes and condense on cold parts. As a result of this it is possible, for example, for visibility through the windscreen to be adversely affected.

A further special form of adhesive consolidation involves activating the binder by partial dissolution or partial swelling. In this case it is also possible in principle for the fibres themselves, or admixed speciality fibres, to take over the function of the binder. Since, however, such solvents are objectionable on environmental grounds, and/or are problematic in their handling, for the majority of polymeric fibres, this process is not often employed.

Advantageously and at least in regions, the textile carrier has a calendered surface. The calendered surface may have been given a chintz treatment, as elucidated in EP 1 448 744 A1, for example. This enhances the dirt repellency.

Starting materials stated for the carrier include, in particular, (manmade) fibres (staple fibre or continuous filament) of synthetic polymers, also called synthetic fibres, of polyester, polyamide, polyimide, aramid, polyolefin, polyacrylonitrile or glass, (manmade) fibres based on natural polymers, such as cellulosic fibres (viscose, Modal, Lyocell, Cupro, acetate, triacetate, Cellulon), such as rubber fibres, such as plant protein fibres and/or such as animal protein fibres and/or natural fibres made of cotton, sisal, flax, silk, hemp, linen, coconut or wool. The present invention, however, is not confined to the materials stated; it is instead possible, as evident to the skilled person without having to take an inventive step, for a multiplicity of further fibres to be used for producing the nonwoven web.

Preferred as material for the carrier is polyester, on account of the excellent ageing resistance and the outstanding media resistance with respect to chemicals and service fluids such as oil, petrol, antifreeze and the like. Polyester, furthermore, has the advantages that it leads to a highly abrasion-resistant and temperature-resistant carrier, which is particularly important for the specific end use for the bundling of cables in motor vehicles and, for example, in the engine compartment.

In accordance with one first advantageous embodiment, the adhesive coating is on the free side of the film.

Indicated below are preferred parameters for the individual layers of the carrier material, without any intention thereby to impose a restriction on the invention.

If the textile carrier used is a spunbonded web (spunbond), the basis weight is preferably 15 to 50 g/m$^2$, more preferably from 15 to 40 g/m$^2$.

If a wet-laid web is used, the basis weight is preferably 25 to 60 g/m$^2$, more preferably 25 to 50 g/m$^2$.

If a needle-punched web is used, the basis weight is preferably 25 to 60 g/m$^2$, more preferably 25 to 50 g/m$^2$.

If a water-jet web (spunlace) is used, the basis weight is preferably 15 to 50 g/m$^2$, more preferably 15 to 40 g/m$^2$.

The film is preferably a thermoplastic single-layer or multi-layer film manufactured in extrusion (especially blown-film extrusion). Alternatively it may be a calendered single-layer film. With further preference, the blowing ratio is at least 1:1.5, especially 1:2 or more. By blowing ratio is meant the factor by which the diameter of the inflated film parison is greater than the die diameter, for a constant take-off speed.

Any polyolefin used is preferably a polyethylene.

In accordance with one further preferred embodiment, the polyolefin, preferably polyethylene, comprises a copolymer of
  (a) an α-olefin of the formula R—CH=CH$_2$, where R is hydrogen or an alkyl radical having 1 to 10 carbon atoms, and
  (b) an α,β-ethylenically unsaturated carboxylic acid of 3 to 8 carbon atoms, and also
  (c) optionally a further monoethylenically unsaturated monomer, with 10% to 90% of the carboxylic acid groups of the copolymer being substituted by metal ions through neutralization.

The term "copolymer" is to be understood such that the copolymer may also comprise two or more different α-olefins or unsaturated carboxylic acids. The unsaturated α-olefin is preferably ethylene, propylene or but-1-ene, more preferably ethylene. The unsaturated carboxylic acid may be a monocarboxylic or dicarboxylic acid such as methacrylic acid or maleic acid.

The layer with the copolymer of the invention may comprise other polymers as well, with the fraction of copolymer of the invention being preferably at least 10% by weight and more preferably at least 50% by weight. Where the film consists of two or more individual layers, at least one layer contains the stated fraction.

The metal ions are preferably monovalent to trivalent, for example from groups I, II, III, IV-A and VII of the Periodic Table of the Elements, more preferably from the group of the alkali metals, more particularly sodium.

The preferred melt index of the copolymer is below 10 g/10 min, preferably below 1 g/10 min, at 2.16 kg and 190° C.

The film described is disclosed at length in DE 103 41 123 A1, hereby incorporated by reference.

In variant versions of the film, it consists of a single-layer film of TPU or of PVC.

With further preference, the film is at least one blown single-layer LDPE film having a thickness of 15 to 80 µm, preferably 15 to 40 µm.

With particular preference the film is or comprises a single-layer LDPE film with a fraction of the above-described copolymer of 20% to 90% by weight, preferably 30% to 80% by weight, and with a thickness of 15 to 80 µm, preferably 15 to 40 µm.

In accordance with another advantageous embodiment, the film is a multi-layer film consisting of at least one layer of the two aforementioned films, more preferably both, with a thickness ratio, with particular preference, of 1:2 to 2:1, and/or with a total thickness, with particular preference, of 15 to 80 µm, preferably 15 to 40 µm.

Particularly preferred is a combination of spunbonded web, wet-laid web, needle-punched web or water-jet web with a three-layer PE film.

The PE film consists of the following layers (from top to bottom):
- LDPE of 5 μm thickness, without carbon black, preferably blended with 1% by weight of anti-blocking agents
- LDPE with 15 μm thickness, containing 8% by weight of carbon black
- LDPE with 5 μm thickness, without carbon black, preferably blended with 1% by weight of anti-blocking agents The film and the web are joined using laminating adhesives, preferably reactive 1- or 2-component PU adhesives.

According to a further advantageous variant of the invention, polyolefin-based thermoplastic laminating adhesives may be used.

The coatweight is preferably 3 to 15 g/m$^2$, more preferably 5 to 10 g/m$^2$.

According to one preferred embodiment, the width of the adhesive tape is between 9 and 38 mm.

Producing an adhesive tape from the carrier can be done using any known adhesive systems. As well as natural-rubber- or synthetic-rubber-based adhesives it is possible in particular to use silicone adhesives and also polyacrylate adhesives, preferably a pressure-sensitive acrylate hotmelt adhesive. On account of their particular suitability as an adhesive for wrapping tapes for automotive cable harnesses, in respect of freedom from fogging, and also of outstanding compatibility with both PVC and PVC-free core insulation, preference is given to solvent-free acrylate hotmelts, as described in more detail in DE 198 07 752 A1 and in DE 100 11 788 A1.

The coatweight varies preferably in the range between 15 to 200 g/m$^2$, more preferably 30 to 120 g/m$^2$ (corresponding approximately to a thickness of 15 to 200 μm, more preferably 30 to 120 μm).

The adhesive is preferably a pressure-sensitive adhesive, in other words an adhesive which even under relatively weak applied pressure allows durable bonding to virtually all substrates and which after use can be detached from the substrate again substantially without residue. A pressure-sensitive adhesive has a permanently pressure-sensitive adhesive effect at room temperature, in other words possessing a sufficiently low viscosity and a high tack, and so the surface of the bonding substrate in question is wetted even with low applied pressure. The bondability of the adhesive derives from its adhesive properties, and the redetachability from its cohesive properties.

A suitable adhesive is one based on acrylate hotmelt, having a K value of at least 20, more particularly greater than 30 (measured respectively in 1% strength by weight solution in toluene, 25° C.), obtainable by concentrating a solution of such an adhesive to form a system which can be processed as a hotmelt.

The K value (according to Fikentscher) is a measure of the average molecular size of high-polymer compounds. The viscosity of polymers is determined using a capillary viscometer in accordance with DIN EN ISO 1628-1:2009.

For the purpose of the measurement, one percent strength (1 g/100 ml) toluenic polymer solutions are prepared at 25° C. and are subjected to measurement using the corresponding DIN Ubbelohde viscometer in accordance with ISO 3105:1994, Table B.9. The concentrating process may take place in appropriately equipped vessels or extruders; especially in the case of accompanying degassing, a venting extruder is preferred.

One such adhesive is set out in DE 43 13 008 C2. In an intermediate step, the solvent is removed entirely from these acrylate adhesives produced in this way.

In addition, further volatile constituents are removed during this procedure. After coating from the melt, these adhesives have only small residual fractions of volatile constituents.

Hence it is possible to adopt all of the monomers/formulas that are claimed in the patent cited above.

The solution of the adhesive may contain 5% to 80% by weight of solvent, more particularly 30% to 70% by weight.

It is preferred to use commercial solvents, more particularly low-boiling hydrocarbons, ketones, alcohols and/or esters.

With further preference, single-screw, twin-screw or multi-screw extruders are used that have one venting unit or, more particularly, two or more venting units.

The acrylate hotmelt-based adhesive may have had benzoin derivatives incorporated into it by polymerization, examples being benzoin acrylate or benzoin methacrylate, acrylic or methacrylic esters. Benzoin derivatives of this kind are described in EP 0 578 151 A.

The acrylate hotmelt-based adhesive may be UV-crosslinked. Other modes of crosslinking are also possible, however, an example being electron beam crosslinking.

In another preferred embodiment, self-adhesives used are copolymers of (meth)acrylic acid and esters thereof having 1 to 25 C atoms, maleic, fumaric and/or itaconic acid, and/or their esters, substituted (meth)acrylamides, maleic anhydride and other vinyl compounds, such as vinyl esters, more particularly vinyl acetate, vinyl alcohols and/or vinyl ethers.

The residual solvent content ought to be below 1% by weight.

One adhesive which is found to be particularly suitable is a pressure-sensitive acrylate hotmelt adhesive of the kind carried under the name acResin, more particularly acResin A260, by BASF. This low-K-value adhesive acquires its application-compatible properties by virtue of a concluding, radiation-initiated crosslinking.

The adhesive may be applied in the form of a stripe in the longitudinal direction of the adhesive tape, the width of the stripe being lower than that of the carrier material of the adhesive tape.

The coated stripe in one advantageous embodiment has a width of 10% to 80% of the width of the carrier material. Particularly preferred is the use of stripes having a coating of 20% to 50% of the width of the carrier material.

Depending on the particular utility, it is also possible for the carrier material to be coated with a plurality of parallel stripes of the adhesive.

The position of the stripe on the carrier is freely selectable, preference being given to an arrangement directly at one of the edges of the carrier.

Additionally it is possible for two stripes of adhesive to be provided, with one stripe of adhesive on the top side of the carrier material and one stripe of adhesive on the underside of the carrier material, with the two stripes of adhesive being located preferably at the opposite longitudinal edges. According to one variant version, the two stripes of adhesive are located at the same longitudinal edge.

The stripe or stripes of adhesive preferably finish in each case flush with the longitudinal edge or edges of the carrier material.

Preparation and processing of the adhesives may take place from solution, from dispersion, and from the melt. Preferred preparation and processing procedures take place from solution and also from the melt. It is particularly preferred to manufacture the adhesive from the melt, in which case, in particular, batch methods or continuous methods may be employed. The continuous manufacture of the pressure-sensitive adhesives with the aid of an extruder is particularly advantageous.

The adhesives thus prepared may then be applied to the carrier using the methods that are common knowledge. In the case of processing from the melt, these application methods may involve a nozzle or a calender.

In the case of processes from solution, coating operations with doctor blades, knives or nozzles are known, to name but a few.

Also possible is the transfer of the adhesive from an anti-adhesive carrier cloth or release liner onto the carrier assembly.

Finally, the adhesive tape may have a liner material, with which the one or two layers of adhesive are lined before use. Liner materials also include all of the materials set out comprehensively above.

It is preferred, however, to use a non-linting material such as a polymeric film or a well-sized long-fibre paper.

If the adhesive tape described is to be of low flammability, this quality can be achieved by adding flame retardants to the carrier, the liner and/or the adhesive. These retardants may be organobromine compounds, if required with synergists such as antimony trioxide, although, with regard to the absence of halogen from the adhesive tape, preference will be given to using red phosphorus, organophosphorus compounds, mineral compounds or intumescent compounds such as ammonium polyphosphate, alone or in conjunction with synergists.

The general expression "adhesive tape" in the context of this invention encompasses all sheetlike structures such as two-dimensionally extended sheets or sheet sections, tapes with extended length and limited width, tape sections and the like, and also, lastly, diecuts or labels.

Applied to the reverse of the adhesive tape may be a reverse-face varnish, in order to exert a favourable influence over the unwind properties of the adhesive tape wound into an Archimedean spiral. This reverse-face varnish may for this purpose be furnished with silicone compounds or fluorosilicone compounds and also with polyvinylstearylcarbamate, polyethyleneiminestearylcarbamide or organofluorine compounds as abhesive substances. Optionally, below the reverse-face varnish, or as an alternative to it, there is a foam coating located on the reverse of the adhesive tape.

The adhesive tape of the invention may be provided in fixed lengths, such as in the form of meter-length product, for example, or else as a continuous product on rolls (Archimedean spiral). In the latter case, for use, it is possible to separate off variable lengths by means of knives, scissors or dispensers and the like, or the material can be processed by hand without tools.

Furthermore, substantially at right angles to the running direction, the adhesive tape may have one or more weakening lines, thereby making the adhesive tape easier to tear by hand.

In order to allow particularly simple operation for the user, the weakening lines are oriented at right angles to the running direction of the adhesive tape and/or are disposed at regular intervals.

The adhesive tape is particularly simple to sever if the weakening lines are configured in the form of perforations.

In this way it is possible to obtain edges between the individual sections that are highly lint-free, thereby preventing unwanted fraying.

The weakening lines can be produced in a particularly advantageous way either discontinuously, using flat dies or cross-running perforating wheels, or continuously, using rotary systems such as spiked rollers or punch rollers, optionally with the use of a counter-roller (Vulkollan roller) forming the counter-wheel during cutting.

Further possibilities include cutting technologies which are controlled to operate intermittently, such as the use of lasers, ultrasound, or high-pressure water jets, etc., for example. Where, in the case of laser or ultrasound cutting, some of the energy is introduced into the carrier material in the form of heat, it is possible to melt the fibres in the area of cutting, thereby very largely preventing disruptive fraying, and producing sharply contoured cut edges. Latter methods are also suitable for obtaining specific cut edge geometries, such as concave or convex cut edges, for example.

The height of the spikes or blades on the punch rollers is preferably 150% of the thickness of the adhesive tape.

The hole/bridge ratio in the case of perforation—that is, the ratio of the number of millimeters where the material holds together ("bridge") to the number of millimeters over which it is severed—determines how easily the fibres of the carrier material, in particular, are to tear. Furthermore, this ratio also ultimately influences the extent to which the torn edge is lint-free.

The bridge width is preferably approximately 2 mm and the cut width between the bridges is approximately 10 mm; in other words, bridges 2 mm wide alternate with incisions 10 mm long. The hole/bridge ratio, accordingly, is preferably 2:10.

With this weakening of the material it is possible to achieve a sufficiently low tearing force.

The adhesive tape is preferably used for jacketing elongate material such as, in particular, cable looms, with the elongate material being wrapped in axial direction by the adhesive tape, or the adhesive tape being passed in a helical spiral around the elongate material.

The concept of the invention also embraces, lastly, an elongate material jacketed with an adhesive tape of the invention. The elongate material is preferably a cable loom, more preferably in a motor vehicle.

The adhesive tape of the invention affords advantages that were not foreseeable as such for the skilled person.

The combination of thin nonwoven webs (class B) and thin films (class A) in the laminate of the invention results unexpectedly in better sound damping, namely class C (see example 3) rather than class B, as the skilled person would have expected.

The web in conjunction with the film in the carrier material takes on a protective function at high temperatures and thereby allows, for example, a non-crosslinked PE film (which is actually classed in T2) to be graded higher in temperature resistance, according to T3 or T4 (see examples 1 to 3). The nonwoven web takes on a support function for the PE film. The film, though it may melt at higher temperatures, is held in position by the web.

The use of a thin film makes it possible in turn to achieve a distinct reduction in the basis weight of the nonwoven, since thin points in the nonwoven are closed by the film. In comparison to a pure film-backed adhesive tape, a textile feel exists. At the same time, the visually opaque, impervious surface results in a uniform appearance. This aspect is of particular interest from the standpoint of economics (reducing nonwoven-web costs through a reduction in the basis weight).

At the same time there is a reduction of the coatweight, since there is no adhesive recessed in the nonwoven web, something which is otherwise unavoidable. Moreover, the film to be coated offers a planar substrate, which can therefore be coated particularly easily and cleanly.

In the laminate of the invention, the (PE) film prevents excessive access of oxygen to the adhesive, and therefore slows down the ageing of the adhesive. As a result of the delayed ageing of the adhesive, fewer radicals are produced over the test period, and the cable insulation retains its flexibility for a longer time.

This advantage is particularly manifested, of course, with sensitive adhesives, based on natural rubber, for example. In this case the film protects the textile carrier against the degradation products from the rubber composition and/or generally from the adhesive composition that is used.

There is an increase in the ageing resistance.

The combination of the good transverse tearability of the film and the structural strength of the nonwoven results in the attainment of an ideal torn edge.

In the integrated system, the film offers a much better barrier against migration/uptake of media than an absorbent web. PE, for example, is inert towards numerous media, and does not swell.

The adhesive tape exhibits much less of a tendency towards flagging, as a result of the low level of stiffness in the composite (reduction in overall thickness relative to a nonwoven web in the same basis-weight range, and no penetration of the composition into the web). Flagging, in the case of an adhesive tape wound around an element, refers to the tendency of an end of the adhesive tape to stand up. The cause is the combination of the adhesive's holding power, the stiffness of the carrier and the diameter of the cable harness.

A low level of stiffness and of thickness affords good conformability to contours of the cable harness, and retains flexibility.

The adhesive tapes with carriers of this kind can be torn into by hand with relatively few problems, and this is likewise particularly important for the described end use and for the particularly preferred processing in the form of a wrapping tape for the bundling of cables in motor vehicles.

A transverse-direction tensile strength of less than 10 N, determined according to the AFERA 4007 standard, serves as a criterion of the hand-tearability of the adhesive tape.

The adhesive tape will be elucidated in more detail below, using a number of figures and a number of examples, without thereby wishing to bring about any restriction, of whatever kind.

BRIEF DESCRIPTION OF THE DRAWINGS

FIG. 1 shows, in section in the transverse direction (cross-cut), the adhesive tape, consisting of a carrier material 10, on one side of which a layer of a self-adhesive coating 12 is applied.

The carrier material 10 consists of a laminate, which is formed from a textile carrier 1 and from a film 3 located on the underside of the textile carrier 1.

Located between textile carrier 1 and film 3 is a layer of a laminating adhesive 2.

Figure 1:
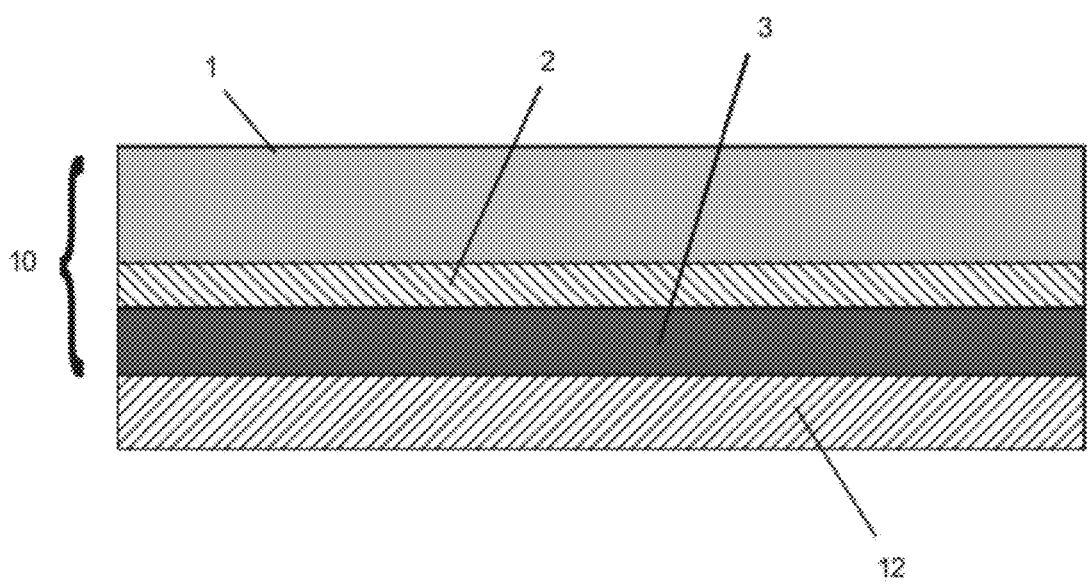
FIG. 1 shows the adhesive tape in a lateral section.
Figure 2:
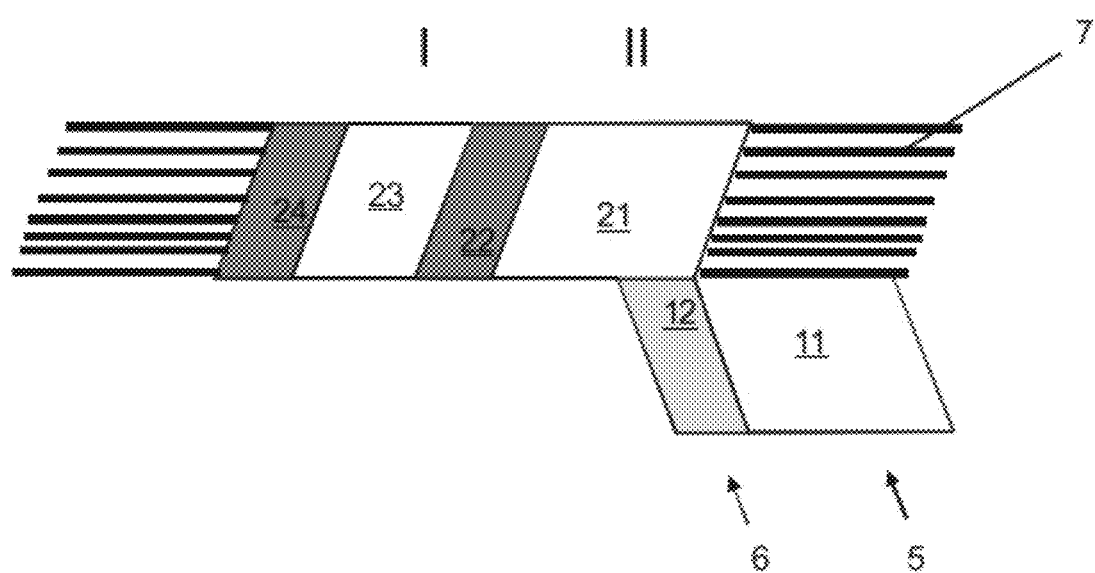
FIG. 2 shows one section of a cable loom which is composed of a bundling of individual cables and is jacketed with the adhesive tape of the invention.

FIG. 2 shows one section of a cable loom which is composed of a bundling of individual cables 7 and is jacketed with the adhesive tape of the invention. The adhesive tape is passed in a spiral motion around the cable harness.

The section of cable harness shown has two turns, I and II, of the adhesive tape. Further turns would extend towards the left, but are not shown here.

Present on the adhesive coating is a stripe 5 of the liner, thus producing an adhesive stripe 6 which extends in the longitudinal direction of the tape. Non-adhesive regions 11, 21, 23 of the adhesive tape alternate with adhesive regions 12, 22, 24. (In contrast to the exposed adhesive 12, the sections 22 and 24 are not visible from the outside, which is why the denser shading has been selected to illustrate them.)

The cable harness is jacketed such that the adhesive stripe 6 adheres fully on the adhesive tape. Sticking to the cables 7 is precluded.

EXAMPLES

Example 1

Textile carrier: Wet-laid web
   Basis weight: 35 g/m$^2$
   Composition: 22% by weight polyester, 26.5% by weight cellulose,
   51.5% by weight binder
Laminating adhesive: Acrylate adhesive
Film: 70 μm 3-layer PE film from Nordenia
   as described in detail above
Pressure-sensitive
adhesive: Acrylate adhesive
Key features:
   Damping class B
   Temperature class T3 (as per Ford and LV 312)
   Very good media resistance
   Very good hand-tearability Example 2

Textile carrier: Spunbond web
   Basis weight: 34 g/m$^2$
Composition: 100% by weight polyester
Laminating adhesive: Acrylate adhesive
Film: 70 μm 3-layer PE film from Nordenia
   as described in detail above
Pressure-sensitive
adhesive: Acrylate adhesive
Key features:
   Damping class B
   Temperature class T3 (as per Ford and LV 312)
   Very good media resistance
   Very good hand-tearability Example 3

Textile carrier: Needle-punched web
   Basis weight: 40 g/m$^2$
Composition: 100% by weight polyester
Laminating adhesive: Acrylate adhesive
Film: 70 μm 3-layer PE film from Nordenia
   as described in detail above
Pressure-sensitive
adhesive: Acrylate adhesive
Key features:
   Damping class C
   Temperature class T3 (as per Ford and LV 312)
   Very good media resistance
   Good hand-tearability

The invention claimed is:

1. An adhesive tape consisting of a carrier material and an adhesive coating on at least one side of the carrier material, wherein the carrier material consists of a laminate consisting of: (i) a textile carrier in the form of a web selected from the group consisting of a spunbonded web, a wet-laid web, a needle-punched web, and a water-jet web; (ii) a solid film; and (iii) a laminating adhesive joining the textile carrier and the solid film, wherein the textile carrier has a basis weight of 15 to 60 $g/m^2$, wherein the film has a thickness of 15 to 80 µm, and wherein the film is on an underside of the textile carrier and positioned between the textile carrier and said adhesive coating.

2. The adhesive tape according to claim 1, wherein the adhesive coating is on a free side of the film.

3. The adhesive tape according to claim 2, wherein the web of textile carrier is consolidated at least one of mechanically, thermally and/or chemically.

4. The adhesive tape according to claim 1, wherein the laminate consists of the web of the textile carrier, the laminating adhesive and a multilayer PE film.

5. The adhesive tape according to claim 1, wherein the width of the carrier material is between 9 to 38 mm.

6. The adhesive tape according to claim 1, wherein the carrier material comprises at least polyester and has a basis weight of 15 to 40 $g/m^2$ or 25 to 50 $g/m^2$.

7. The adhesive tape according to claim 1, wherein the coating of adhesive comprises an adhesive based on natural rubber, synthetic rubber, acrylate, or silicone.

8. A method of jacketing elongate material, comprising passing the adhesive tape according to claim 1 in a helical line around the elongate material.

9. A method of jacketing elongate material, comprising wrapping the adhesive tape according to claim 1 in an axial direction around the elongate material.

10. An elongate material jacketed with the adhesive tape according to claim 1.

11. The elongate material according to claim 10, which is a cable loom.

12. The adhesive tape according to claim 1, wherein the film comprises a first polyethylene layer, a second polyethylene layer and a third polyethylene layer, wherein at least one of the first and third polyethylene layers comprises one or more anti-blocking agents.

13. The adhesive tape according to claim 12, wherein both of the first and third polyethylene layers comprise the one or more anti-blocking agents.

14. The adhesive tape according to claim 13, wherein the second polyethylene layer is located between the first and third polyethylene layers and comprises carbon black.

15. The adhesive tape according to claim 1, wherein a polyolefin-based thermoplastic laminating adhesive joins the film and the web together, and further wherein a coatweight of the laminating adhesive is 3 to 15 $g/m^2$.

16. The adhesive tape according to claim 15, wherein a coatweight of the laminating adhesive is 5 to 10 $g/m^2$.

* * * * *